(12) United States Patent
Riviere et al.

(10) Patent No.: US 7,309,193 B2
(45) Date of Patent: Dec. 18, 2007

(54) INDEXABLE INSERT WITH CORNERS WITH DIFFERENT RADII

(75) Inventors: Bertrand Riviere, Bourges (FR);
Christer Jonsson, Hedemora (SE);
Matti Karonen, Hedemora (SE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 11/162,628

(22) Filed: Sep. 16, 2005

(65) Prior Publication Data
US 2006/0056928 A1 Mar. 16, 2006

Related U.S. Application Data

(63) Continuation of application No. PCT/SE2004/000382, filed on Mar. 16, 2004.

(30) Foreign Application Priority Data
Mar. 17, 2003 (SE) .................... 0300739
Mar. 17, 2003 (SE) .................... 0300740

(51) Int. Cl.
*B23B 27/22* (2006.01)
(52) U.S. Cl. .................... 407/113; 407/115
(58) Field of Classification Search ............ 407/107, 407/113, 114, 35, 115, 116
See application file for complete search history.

(56) References Cited

U.S. PATENT DOCUMENTS

| | | | |
|---|---|---|---|
| 5,017,055 A | | 5/1991 | Tsujimura et al. |
| 5,593,255 A | * | 1/1997 | Satran et al. ............... 407/113 |
| 5,951,213 A | * | 9/1999 | Fauser et al. ............... 407/35 |
| 6,193,446 B1 | * | 2/2001 | Astrom et al. ............... 407/114 |
| 6,257,807 B1 | * | 7/2001 | Heinloth ............... 407/113 |
| 6,379,087 B1 | * | 4/2002 | Alexander, IV ............ 407/107 |
| 7,040,844 B1 | * | 5/2006 | Daiguji ............... 407/113 |
| 2002/0037199 A1 | | 3/2002 | Satran et al. |

FOREIGN PATENT DOCUMENTS

JP  6179110  6/1994

OTHER PUBLICATIONS

International Search Report for corresponding PCT/SE2004/000382.

* cited by examiner

*Primary Examiner*—Willmon Fridie, Jr.
(74) *Attorney, Agent, or Firm*—WRB-IP LLP

(57) ABSTRACT

The present invention relates to an indexable cutting insert for an end mill for machining of contours in a workpiece and to a milling tool. The cutting insert is asymmetrical in respect of a line through a hole in the cutting insert. The cutting insert comprises two cutting edge portions. Each cutting edge portion comprises a substantially straight cutting edge and a curved cutting edge along respective intersecting lines between a clearance surface and a rake face. The curved cutting edges have different lengths. The cutting insert has a bottom side and a first and a second opposite corner. The second corner is defined in plane view by a radius that is greater than, preferably at least twice as great as a radius of the first corner.

21 Claims, 4 Drawing Sheets

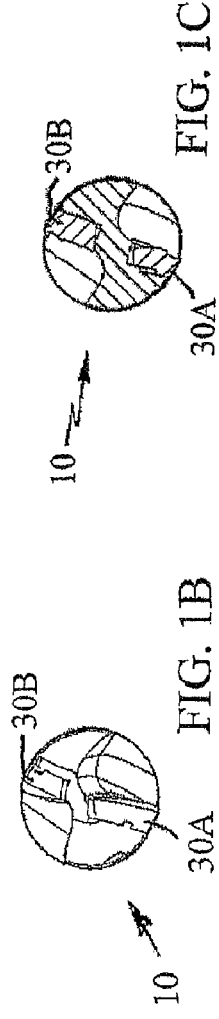
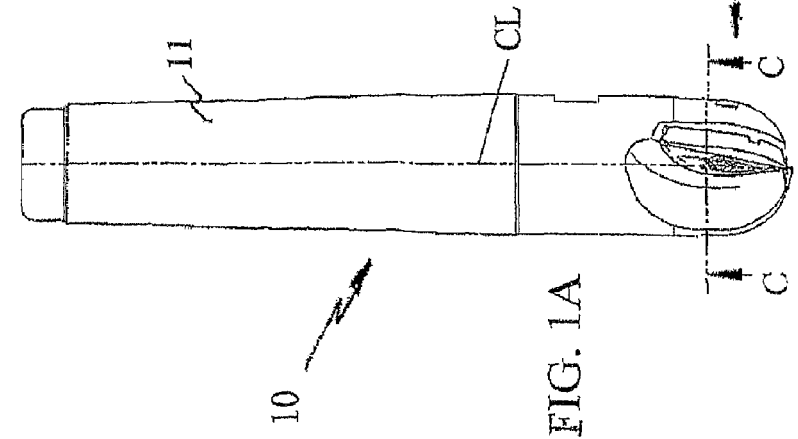
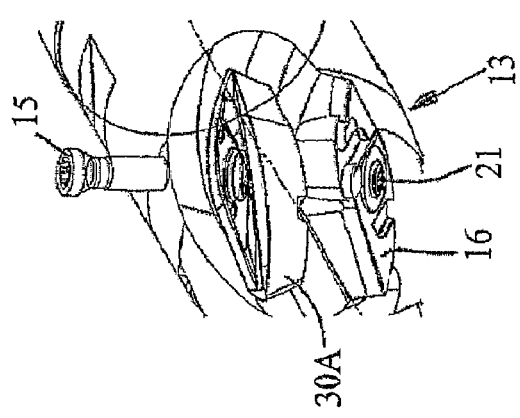
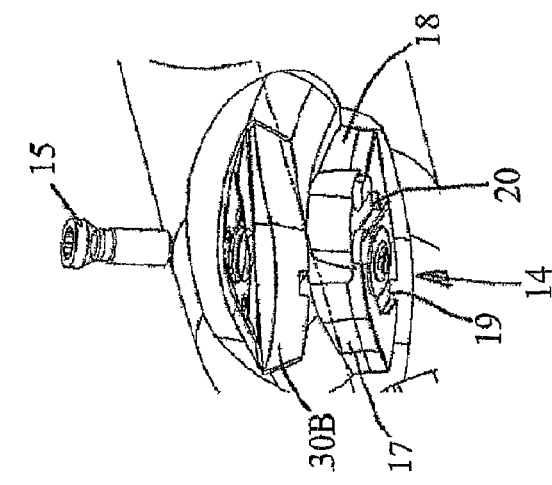

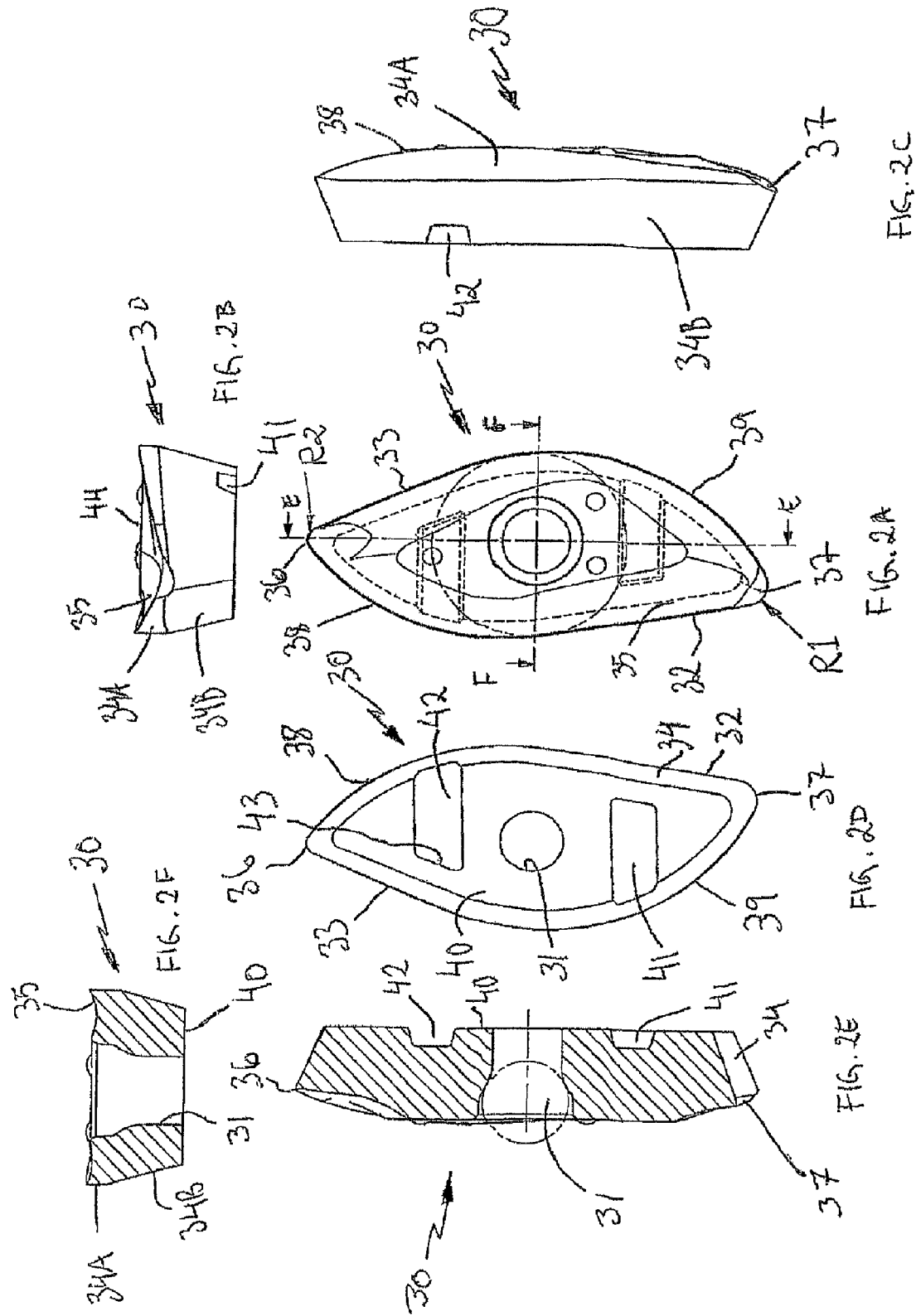

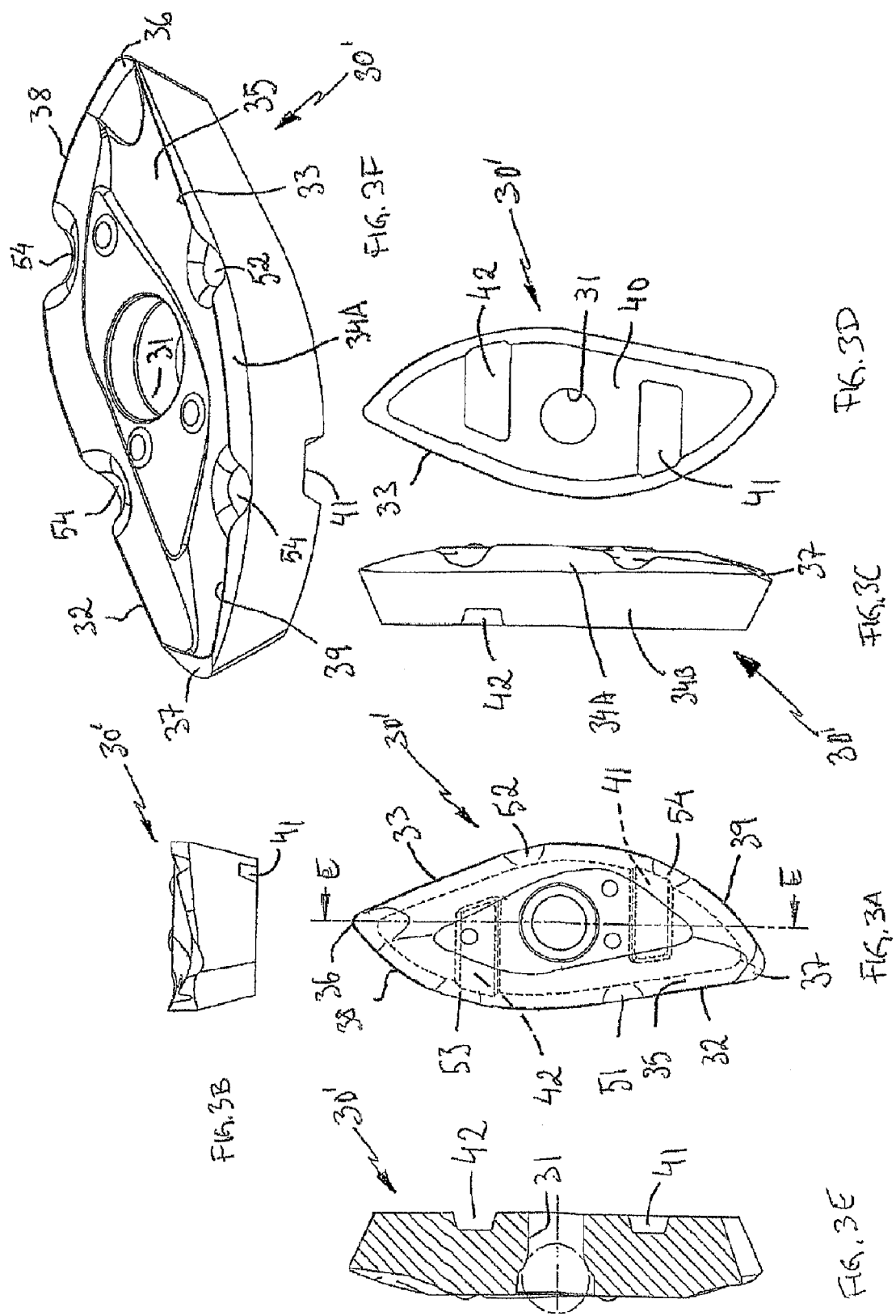

INDEXABLE INSERT WITH CORNERS WITH DIFFERENT RADII

The present application is a continuation of PCT/SE2004/000382, filed Mar. 16, 2004.

BACKGROUND AND SUMMARY

The present invention relates to an indexable cutting insert for an end mill for the machining of contours in a workpiece, which is based on EP-B1-504 608.

An end mill is used during complicated, and severe conditions with intensely fluctuating cutting forces under heavy demands regarding the machining precision. If indexable cutting inserts are used for an end mill, it is important to place such indexable cutting inserts precisely in relation to the tool body and to clamp the cutting insert rigidly on the tool body.

A conventional indexable cutting insert for an end mill, see, for instance, U.S. Pat. No. 6,149,355 and U.S. Pat. No. 5,951,121, has two cutting edges, each comprising a curved edge and a substantially straight edge connecting to one end thereof. In its entirety, the cutting insert has an oval shape as seen in top view. Thus, if the cutting insert is a positive cutting insert, i.e. a cutting insert having a leaning side, it is very difficult to precisely position the cutting insert on a tool body and clamp the same rigidly.

It is desirable to provide a durable cutting insert for a tool body.

It is desirable to provide an easy-cutting cutting insert.

It is desirable to provide a cutting insert that makes precise positioning of the cutting insert in the tool body possible.

It is desirable to provide a cutting insert that may be clamped rigidly in the tool body.

According to an aspect of the present invention, an indexable cutting insert for a milling tool is provided. The cutting insert is asymmetrical in respect of a line through a hole in the cutting insert, the cutting insert comprising two cutting edge portions, each cutting edge portion comprising a substantially straight cutting edge and a curved cutting edge along respective intersecting lines between a clearance surface and a rake face, the curved cutting edges having different lengths, the cutting insert having a bottom side and a first and a second opposite corner, wherein the second corner is defined in plane view by a radius that is greater than, preferably at least twice as great as, a radius of the first corner.

BRIEF DESCRIPTION OF THE DRAWINGS

FIG. 1A shows a milling tool in side view. FIG. 1B shows the milling tool in end view. FIG. 1C shows the milling tool in cross-section according to the line C-C in FIG. 1A. FIGS. 1D and 1E show exploded views of feasible positions of the cutting insert in the milling body.

FIG. 2A shows a cutting insert according to the present invention in plane view. FIG. 2B shows the cutting insert in end view. FIG. 2C shows the cutting insert in side view. FIG. 2D shows the cutting insert in bottom view. FIG. 2E shows the cutting insert in cross-section according to the line E-E in FIG. 2A. FIG. 2F shows the cutting insert in cross-section according to the line F-F in FIG. 2A.

FIG. 3A shows an alternative embodiment of a cutting insert according to the present invention in plane view. FIG. 3B shows the cutting insert in end view. FIG. 3C shows the cutting insert in side view. FIG. 3D shows the cutting insert in bottom view. FIG. 3E shows the cutting insert in cross-section according to the line E-E in FIG. 3A. FIG. 3F shows the cutting insert in perspective view.

DETAILED DESCRIPTION

Figure 1F:
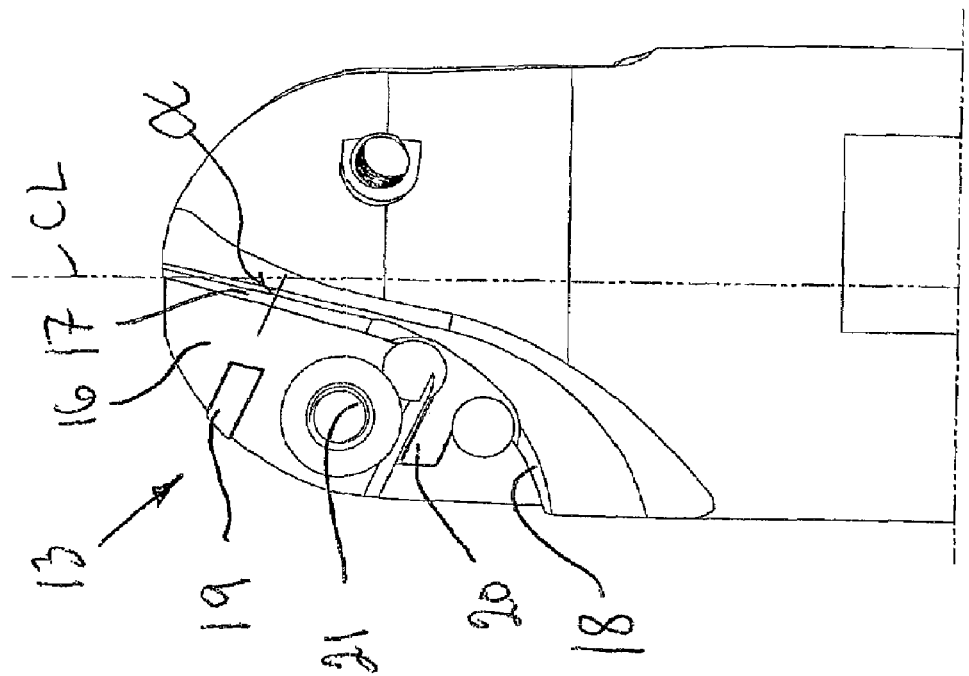
FIG. 1F shows a holder in side view having an interior cutting insert pocket.

In FIGS. 1A-1E, a milling tool 10 is shown, intended to machine foremost moulding tools for the moulding industry. The milling tool has a holder having a shaft 11 and a front chip-removing end 12. The end 12 has two cutting insert pockets 13, 14, each carrying a cutting insert 30 according to the present invention, preferably made from sintered cemented carbide. A clamping member or a screw 15 holds the cutting insert in the cutting insert pocket. The cutting inserts 30A, 30B are so placed that one of the cutting inserts or the interior cutting insert 30A in the interior cutting insert pocket 13 extends in to and preferably past the centre line CL of the tool. This means that the tool can bore in the workpiece. The second cutting insert or the exterior cutting insert 30B in the exterior cutting insert pocket 14 is arranged somewhat at the side of the centre line CL. The active cutting edges of the cutting inserts are arranged so that they form a perfect semi-sphere upon rotation.

Each cutting insert pocket 13, 14 comprises a base surface 16, which has a central threaded boring 21 in order to receive the screw 15. Furthermore, the cutting insert pocket has a front 17 and a rear shoulder 18, with the positions being related to the axial direction of the tool. The base surface 16 comprises two projections 19, 20, arranged on both sides of and at different distances from the boring 21.

Figure 1G:
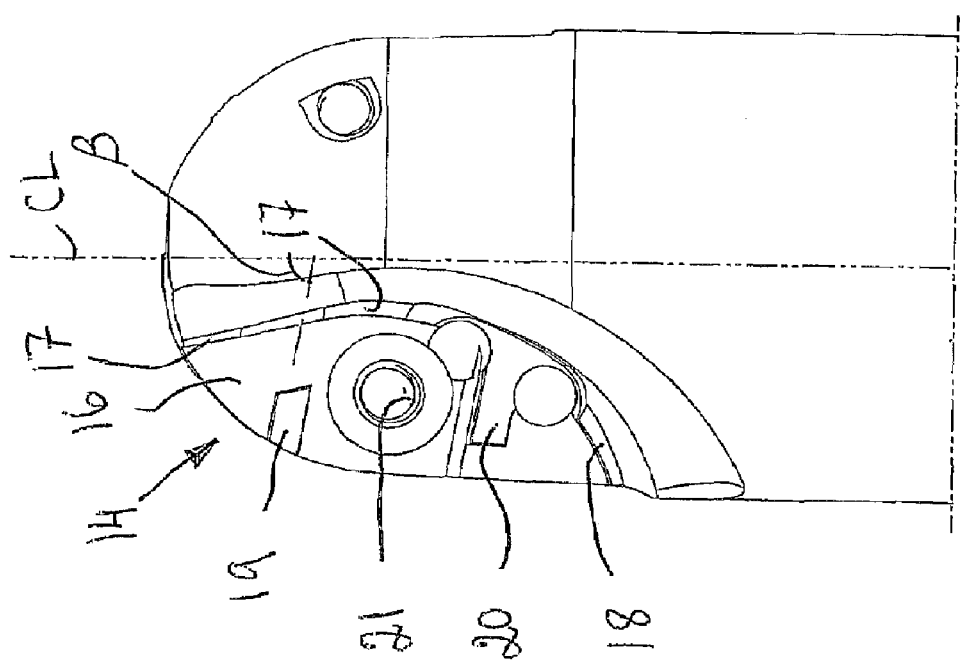
FIG. 1G shows the holder in side view having an exterior cutting insert pocket.

The axially front projection 19 connects radially outwardly to the envelope surface of the tool and has an extension radially inwardly, approximately halfway towards the front shoulder 17. The axially rear projection 20 connects radially inwardly to the area of the rear shoulder 18 and has an extension radially outwardly, approximately half-way in the direction towards the envelope surface. In the interior cutting insert pocket 13, an extension of each projection 19, 20 forms an acute angle $\alpha$ to the centre line CL, see FIG. 1F. In the exterior cutting insert pocket 14, an extension of each projection 19, 20 forms an acute angles s to the centre line CL, see FIG. 1G. The angle $\alpha$ is smaller than the angle $\beta$. Each projection 19, 20 has a substantially rectangular cross-section with a somewhat chamfered top side.

The cutting insert 30 that is shown in FIGS. 2A-2F fits, as has been said above, in both the insert pockets 13, 14. The cutting insert is asymmetrical in respect of a line through a hole 31 of the cutting insert. The cutting insert has in planar view a so-called eye-shape or leaf-shape and comprises two cutting edge portions, each cutting edge portion comprising a substantially straight cutting edge 32, 33 and a cutting edge 38, 39 curved in planar view along respective intersecting lines between a clearance surface 34A and a chip surface 35. The curved cutting edges 38, 39 have different lengths. The straight cutting edges 32, 33 are not parallel but form an angle to each other, conveniently between 4° and 20°, preferably between 6° and 15°.

The straight cutting edges connect in the direction towards opposite cutting corners 36, 37 to curved cutting edges 38, 39. The curved cutting edges 38, 39 are both defined by radii, e.g., between 5 and 25 mm. The curved cutting edge 38 coincides with a circular sector of about 85° to 97° while the curved cutting edge 39 coincides with a circular sector of about 95° to 107°. The curved edges 38, 39 have radii that in a mounted state are substantially identical. The curved cutting edge comprises at least 40% of the extension of the cutting portion. The curved cutting edges 38, 39 are convex in a side view according to FIG. 2C. The lower part 34B of the clearance surface 34 forms an obtuse angle to the bottom side 40 of the cutting insert. The upper part 34A of the clearance surface 34 is substantially perpendicular in relation to the bottom side 40 of the cutting insert. The upper part 34A ensures that associated cutting edge gets a relatively good strength.

The bottom side 40 is provided with two recesses or grooves 41, 42.

Each groove 41, 42 intersects solely one of the clearance surfaces 34 under the curved cutting edge 38, 39. Thus, the groove has a limited extension transverse to the longitudinal direction of the cutting insert and is limited by an end wall 43. Said extension of the groove is greater than 50% of the width of the base surface 40 where the recess has been arranged. An area of the bottom side 40 remains accordingly unaffected by the groove and therefore a feasible support surface for the cutting insert is retained. The groove has in cross-section the shape of a truncated triangle. The groove 41 is by comparison with the groove 42 arranged closer the hole 31, and therefore the cutting insert can only be placed in one way in the cutting insert pocket.

The curved cutting edge gives a positive and constantly axial cutting process along the entire edge.

The cutting corners may be divided in to a first or sharp corner 36 and a second or obtuse corner 37. The obtuse corner has a double function to protect the cutting insert in the centre upon machining in solid material, such as upon drilling, as well as when the cutting insert has been arranged in the exterior cutting insert pocket, the corner 37 will generate a progressive curve, which enables variable machining of deep shoulders. The sharp corner 36 will only be of use in the exterior cutting insert pocket 14. The obtuse corner 37 is defined in plane view according to FIG. 2A by a radius R1, which is greater than, preferably at least twice as great as the radius R2 for the sharp corner 36. The obtuse corner 37 has a negative rake angle and slopes in the direction towards the bottom side 40 from the rake face 35, i.e., the corner 37 slopes from the rake face 35 towards a plane that coincides with the bottom side 40. The sharp corner 36 has a positive rake angle and comprises a continuous extension of the rake face 35. The cutting insert has an elevated central portion 44 around the hole 31. The portion 44 may act as a chip breaker. The portion 44 comprises markings, where one knob relates to peripheral mounting and two knobs means central mounting. The corresponding markings exist at the insert pockets 13 and 14.

FIGS. 3A-3F show an alternative embodiment of a cutting insert 30' according to the present invention. What distinguishes the cutting insert 30' from the previously described cutting insert 30 is that the cutting insert 30' is formed with chip breakers optimised for machining of work materials being difficult to turn. Equal details have been provided with equal reference numerals. The chip breakers comprise of recesses 51, 52, 53 and 54 in the cutting edges 32, 33, 38 and 39, respectively.

Each recess extends down into the upper part 34A of the clearance surface as well as also a distance into the rake face 35. As may be seen from the plane view according to FIG. 3A, the recesses 51, 54 and 52, 53 are arranged substantially in level with the grooves 41 and 42, respectively.

The cutting insert 30, 30' may have a chamfer along the periphery of the bottom side 40 allowing the cutting insert pocket to be formed with relatively great radii.

The cutting insert 30, 30' is mounted in the following way. The cutting insert 30A is brought towards the exterior cutting insert pocket 13 so that the recesses 41, 42 are aligned with the projections 19, 20. In the correct position, the screw 15 can be inserted through the hole 31 and tightened in the boring 21.

Thereby, the bottom side 40 of the cutting insert is pressed against the base surface 16 while three parts of the clearance surface 34B separated from each other will come to abutment against the shoulders 17, 18 in the cutting insert pocket 13. The flanks of the projections will come to abutment against the recesses 41, 42 not until upon machining provided that the cutting insert on that occasion is allowed to move somewhat. Upon mounting of the cutting insert 30B in the interior cutting insert pocket 14, the bottom side 40 of the cutting insert is pressed against the base surface 16 while two parts of the clearance surface 34B separated from each other will come to abutment against the shoulders 17, 18 in the cutting insert pocket 13. As at the exterior cutting insert pocket, the projections and the recesses cooperate only under load of the cutting insert 30B. Because the recess 41 intersects the clearance surface only on one side, the axially front projection 19 will, upon a possible deflection of the screw, abut against the end wall 43, and thereby additionally secure the cutting insert against loosening.

Thus, the present invention relates to a durable cutting insert that is easy-cutting and that makes precise and stable positioning of the cutting insert in the tool body possible. The cutting insert according to the present invention has chip-dividing properties in one embodiment.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. An indexable cutting insert for a milling tool, the cutting insert being asymmetrical in respect of a line through a hole in the cutting insert, the cutting insert comprising first and second cutting edge portions, each cutting edge portion comprising a substantially straight cutting edge and a curved cutting edge along respective intersecting lines between a clearance surface and a rake face and, for each cutting edge portion, lines extending substantially perpendicularly to an axis of the hole and drawn through endpoints of the straight cutting edge and the curved cutting edge of the cutting edge portion intersect to define an obtuse angle when viewed along the axis of the hole, the curved cutting edges having different lengths, the cutting insert having a bottom side and a first and a second opposite corner, the first and second opposite corners being defined by intersections between curved cutting edges of the first and second cutting edge portions and straight cutting edges of the second and first cutting edge portions, respectively, the first and second opposite corners defining parts of the two cutting edge portions, wherein the second corner is defined in plan view by a radius that is greater than a radius of the first corner.

2. The cutting insert according to claim 1, wherein the second corner has a negative rake angle and slopes from the rake face towards a plane that coincides with the bottom side.

3. The cutting insert according to claim 2, wherein the first corner has a positive rake angle and comprises a continuous extension of the rake face.

4. The cutting insert according to claim 3, wherein the cutting insert comprises chip breakers comprising recesses in the cutting edges.

5. The cutting insert according to claim 4, wherein the cutting insert comprises recesses in a bottom side of the cutting insert.

6. The cutting insert according to claim 5, wherein the recesses are arranged on both sides of and at different distances from the hole of the cutting insert.

7. The cutting insert according to claim 5, wherein each recess intersects one of the clearance surfaces below the curved cutting edge.

8. The cutting insert according to claim 7, wherein each recess has a limited extension transverse to the longitudinal direction of the cutting insert and is limited by an end wall.

9. The cutting insert according to claim 5, wherein an extension of each recess is greater than 50% of a width of the bottom side of the cutting insert.

10. The cutting insert according to claim 9, wherein the recess in cross-section has the shape of a truncated triangle.

11. The cutting insert according to claim 1, wherein the curved cutting edge comprises at least 40% of an extension of the cutting portion.

12. The cutting insert according to claim 11, wherein the substantially straight cutting edges are not parallel but form an angle to each other.

13. The cutting insert according to claim 1, wherein the first corner has a positive rake angle and comprises a continuous extension of the rake face.

14. The cutting insert according to claim 1, wherein the cutting insert comprises chip breakers comprising recesses in the cutting edges.

15. The cutting insert according to claim 1, wherein the cutting insert comprises recesses in a bottom side of the cutting insert.

16. The cutting insert according to claim 15, wherein the recesses are arranged on both sides of and at different distances from the hole of the cutting insert.

17. The cutting insert according to claim 15, wherein each recess intersects one of the clearance surfaces below the curved cutting edge.

18. The cutting insert according to claim 17, wherein each recess has a limited extension transverse to the longitudinal direction of the cutting insert and is limited by an end wall.

19. The cutting insert according to claim 15, wherein an extension of each recess is greater than 50% of a width of the bottom side of the cutting insert.

20. The cutting insert according to claim 19, wherein the recess in cross-section has the shape of a truncated triangle.

21. The cutting insert according to claim 1, wherein the radius of the second corner is at least twice as great as the radius of the first corner.

* * * * *